United States Patent [19]
Pimentel

[11] Patent Number: 5,711,050
[45] Date of Patent: Jan. 27, 1998

[54] CHAIN CLEANER FOR BREAD-BUN OVENS AND PROOF BOXES

[76] Inventor: Robert E. Pimentel, 15 Lakeview Dr., Bellingham, Mass. 02019

[21] Appl. No.: 560,292

[22] Filed: Nov. 17, 1995

[51] Int. Cl.$^6$ ............................ B65G 45/00; B61K 3/00
[52] U.S. Cl. ............................ 15/302; 15/308; 15/256.5; 15/256.6; 198/495; 198/496; 198/500; 134/104.1; 154/15.1; 154/15.2; 154/15.3
[58] Field of Search ............................ 15/88.1, 88.2, 15/88.3, 256.5, 246, 302, 309.1, 256.6, 308; 198/493, 494, 495, 496, 500; 134/115.12, 45, 104.1; 184/15.1, 15.2, 15.3

[56] References Cited

U.S. PATENT DOCUMENTS

| | | | |
|---|---|---|---|
| 1,791,728 | 2/1931 | Linfesty | 198/496 |
| 2,060,491 | 11/1936 | Dunlop | 15/256.5 |
| 2,512,073 | 6/1950 | Sandberg | 15/256.5 |
| 2,893,516 | 7/1959 | Bocchino | 15/256.6 |
| 3,229,808 | 1/1966 | Olson | 15/256.5 |
| 3,561,032 | 2/1971 | Kasnyik et al. | 15/88.2 |
| 4,148,109 | 4/1979 | Morley | 15/345 |
| 4,416,367 | 11/1983 | Easton | 198/496 |
| 4,593,923 | 6/1986 | Thalmann | 280/261 |
| 4,678,075 | 7/1987 | Bowman, Jr. | 15/88.1 |
| 4,993,538 | 2/1991 | Norbury | 198/495 |
| 5,231,726 | 8/1993 | McKenney et al. | 15/88.3 |
| 5,333,724 | 8/1994 | Wingfield et al. | 198/496 |
| 5,340,495 | 8/1994 | Mulcahy | 252/162 |
| 5,360,084 | 11/1994 | Graf | 15/256.5 |

OTHER PUBLICATIONS

Stewart Systems, Conveyorized Oven Training Manual, Plano, Texas, pp. 22–23.

*Primary Examiner*—Gary K. Graham
*Attorney, Agent, or Firm*—Peter Paul Mitrano

[57] ABSTRACT

A device for cleaning a continuous chain and track, including the wheels of said chain, and then lubricating said chain without dismantling said chain from the track of a large breadbun oven and/or proof box. The device cleans the chain directly above a section of the inspection portion of its track on a platform that comprises jets and wheel-activated brushes for cleaning and then lubricating the portion of the chain on the platform. This allows said chain to be cleaned and then lubricated while in continuous motion as a portion of said chain moves from its track onto said platform. Said device can also be built into the track area, thereby eliminating the requirement for a platform.

7 Claims, 3 Drawing Sheets

CHAIN CLEANER FOR BREAD-BUN OVENS AND PROOF BOXES

BACKGROUND OF INVENTION

Large bread-bun ovens and proof boxes are constructed with continuous chains which pull trays of bread and/or dough through said ovens and proof boxes. Large bread-bun ovens can be the size of small buildings and are sometimes referred to as conveyer ovens. Proof boxes are large boxes with continuous chains that are utilized to reduce the time required for bread dough to rise. The continuous chain is a combination of uniform dual chain links that are interconnected by vertical wheels. Each set of dual chain links forms a horizontal sandwich holding a horizontal wheel at its midpoint. Said chain must be continuously lubricated to ensure proper operation. During use said chain, while exposed to various forms of flour mixture, builds up dirt and grit primarily due to the continuous lubrication of said chain and the exposure to heat that occurs in a bakery. Over time, heavily encrusted carbonized oil build-up occurs on said chain if said chain is not cleaned properly. The wheels of said chain can seize-up when said chain is not properly cleaned and/or lubricated. Said seized-up wheels can cause damage to the track by wearing and/or bending the track that contains said chain. If said chain deteriorates as a result of not being cleaned properly, said chain and/or track are replaced at a substantial cost. Moreover, shut-down time required for the repairs can result in highly undesirable additional costs.

Said ovens usually operate twenty-four hours a day six days a week in order to maintain production. Cleanliness is of the utmost importance in a bakery because of the potential negative effect to the product. The current procedure for cleaning said chain is to dismantle said chain in small sections, remove a section of chain from said oven or proof box, clean a section of said chain on a surface outside of said oven or proof box, reinstall said section of chain, and repeat the process for the next section of chain. The current procedure can take six men three days to clean said chain. The invention eliminates the need to dismantle sections of said chain from said oven or proof box, and thereby reduces the cleaning time to less than twenty-four hours and requires only two men.

SUMMARY OF THE INVENTION

The invention is a device which cleans and lubricates the continuous chains which pull trays of bread and dough through bread-bun ovens and proof boxes. The invention eliminates the need to dismantle the continuous chain piece by piece from the track in said ovens or proof boxes in order to clean said chain. The bread-bun ovens and proof boxes are constructed in a manner that allows very limited access to the continuous chain except for the track areas with exposed inspection track that have removable top flanges where said invention is installed. When the invention is installed above the inspection portion of the track, the invention guides the chain onto a platform where jets and wheel-activated brushes spray air, solvent and lubricant onto a section of the chain. The process continues until the entire chain has traveled over the platform and the chain is cleaned and lubricated. The present invention is not limited to bread ovens or proof boxes. The present invention can be utilized to clean a chain and lubricate the same wherever there is a need for the same.

The present invention is comprised of four zones, with each zone having six jets located in each zone, plus a fifth zone that controls the brushes on a platform that causes said chain to ride up from the track through the platform area and then back into the track. The present invention may be installed permanently into the track area thereby eliminating the need for the platform. Said jets first apply solvent to said chain, including the wheels, then high pressure air is applied while the wheels of said chain are brushed with air, then said chain is air dried and finally said chain is lubricated. The jets are positioned so that the solvent first hits the wheels of said chain from the inside to the outside.

In place of an existing link, a master link is installed that has an oversized piece of rubber attached that cleans the track as said master links travels around the track. The installation of said master link in said chain also facilitates the installation of said chain by allowing the operator of said device to lift the ends of said chain onto the platform before completing the installation of said master link. Said master link also acts as a marker so that the operators of the invention are able to determine when the chain has completed a cycle around the track. Said master link is removed from said chain and said existing link reinstalled when said invention has completed the cleaning and lubricating of the chain.

The waste material from the cleaning of said chain and track is continually collected and disposed by personnel while the invention is in operation so that the end result after the cleaning is completed includes removal of said waste. Each track usually has at least three weep holes in the bottom portion of the track that are utilized during the cleaning process to drain the waste material from the cleaning area of said chain. In addition, the invention has a cover that prevents materials from being dispersed into the environment.

DESCRIPTION OF THE PREFERRED EMBODIMENTS

Figure 1:
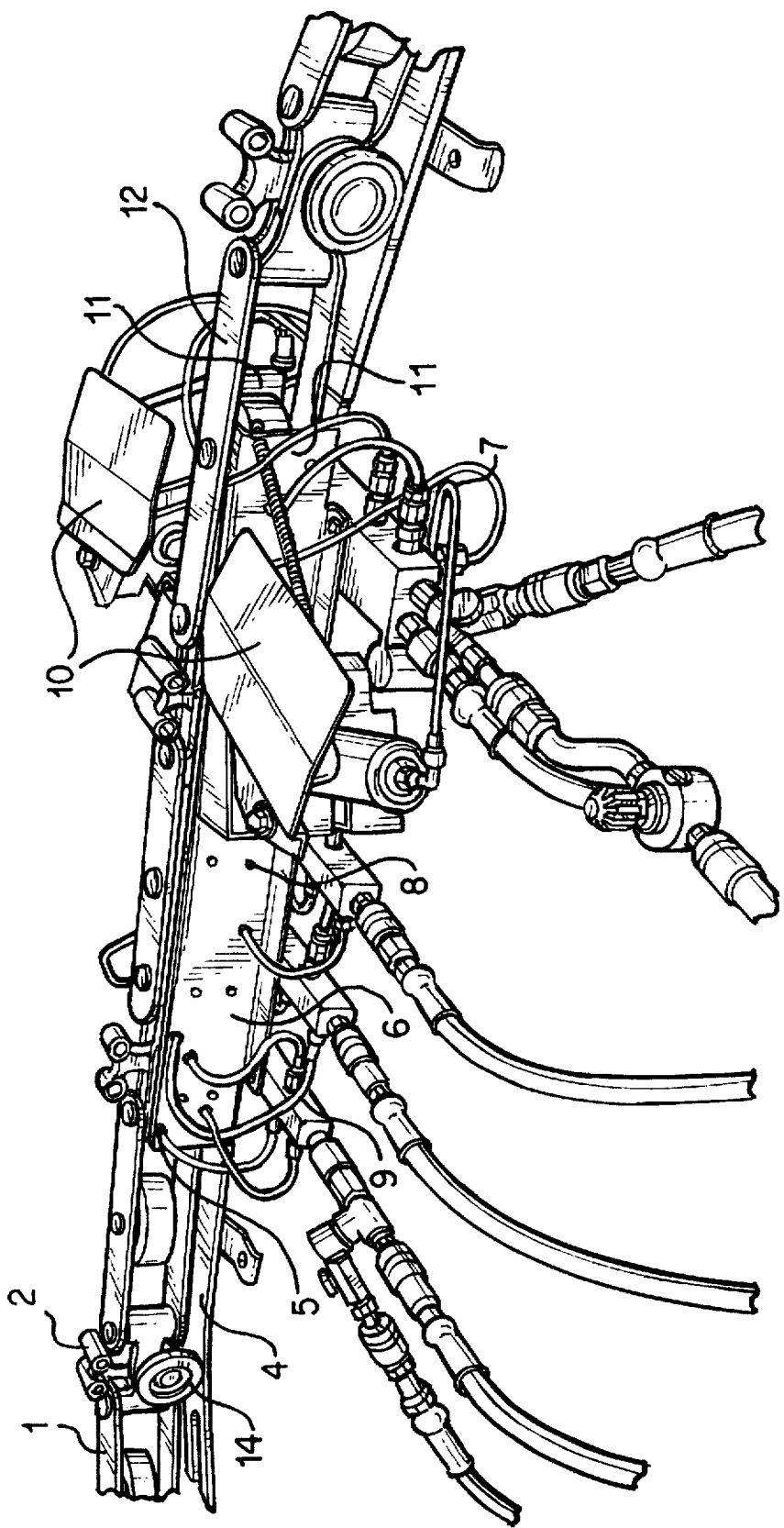
FIG. 1 is a top view of the chain cleaner constructed in accordance with the invention.

FIG. 1 shows the continuous chain 1 in position as the invention cleans and lubricates the continuous chain 1. The continuous chain contains vertical wheels 14 which support and are attached to connectors 2 which are attached to links 12 which hold the horizontal wheels 3. The horizontal wheels facilitate the movement of the chain around turns in the track of the bread-bun ovens and proof boxes. The first step in installing the invention is to remove an existing connector 2 from said chain 1, then place said chain 1 onto the platform 4 and then reinstall the chain and center said chain 1 onto the platform 4.

Said chain 1 is repeatedly moved through the invention at a certain speed and sprayed by the jets 5 with various solutions, then sprayed with air pressure, and then lubricated. Although the continuous chain 1 shown here in FIG. 1 is from a certain manufacturer, the invention is easily adaptable to cleaning other continuous chains that vary in size and dimensions. The vertical plates 6 are fastened onto the platform 4. The front vertical plates 6 have holes 8 drilled at preset positions to enable efficient cleaning of said chain 1. Said holes 8 are sized to fit the stainless steel tubing 9 that acts as a nozzle wherein air, solvent and lubricant flow under pressure. The horizontal plates 10 cause any trays for holding bread or dough to be deflected upward, while certain jets 5 clean the area of said chain 1 where a tray rests on said chain 1.

There are dual brushes 13 which are attached to the platform 4 and the rear vertical plates 11. The brush 13 movement is activated by the vertical wheels 14 of said chain 1 passing over the lever 15 which is U-shaped. The lever 15 activates the movement of the brush 13 cycle that loosens the debris on the vertical wheels 14 of said chain 1. The U-shaped lever 15 allows the links 2 of said chain 1 to pass over the lever 15 without activating the brush 13 action. The brushes 13 are engaged only when the vertical wheels 14 pass over said lever 15. The brushes 13 are not engaged when only the links 12 of the chain ride over said lever. The dimensions of the U-shaped lever 15 will vary according to the distance along the axis of the vertical wheels 14. The brush 13 action provides additional cleaning for the vertical wheels 14 which can seize up from the build-up of lubricant and debris. The tube 7 that connects to the brush is made from a material such as a flexible plastic which is able to withstand the constant motion of the wheel-activated brush. The tube 7 is connected to the control panel that provides compressed air and solvents to the brushes 13.

Figure 2:
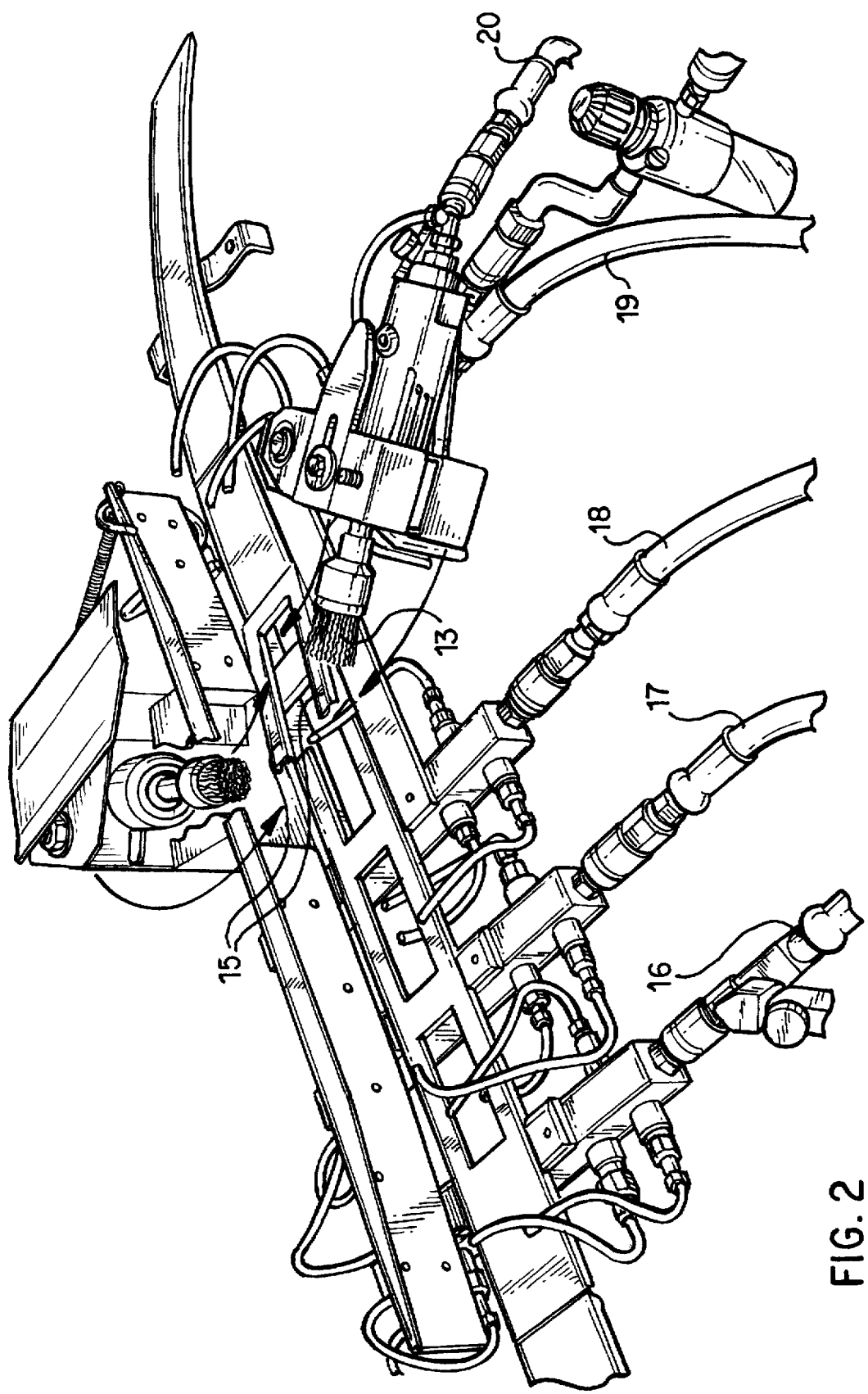
FIG. 2 is a side view of the chain cleaner constructed in accordance with the invention.

FIG. 2 shows four zones 16, 17, 18 and 19 with six jets 5 in each zone. The four zones 16, 17, 18 and 19 of jets 5 with six jets 5 in each zone are placed into certain of said holes 8 depending on the requirement and shape of the particular type of chain being cleaned. The jets 5 are divided so that there are three jets 5 on each side of the invention for each zone. The jets 5 are positioned to accurately reach certain areas of said chain 1 where there is a problem with the build-up of carbon and lubrication. Certain jets 5 are also placed so that the jets 5 spray up from underneath said chain 1. The location of said jets 5 can be adjusted depending on the cleaning requirements of said chain 1. The number of jets 5 can also be increased or decreased depending on the cleaning requirements of said chain 1.

In addition, there is a fifth zone 20 which is used exclusively for the two brushes 13. All zones 16, 17, 18, 19 and 20 can be used to spray air through the jets 5 while the zones utilized for solvent and lubrication are not mixed. The pressure applied through each jet can also be adjusted by the control panel for the invention. As long as the brushes 13 are kept at the same elevation relative to the chain 1, the location of said brushes 13 relative to the jets 5 is not critical to said invention.

The process of cleaning said chain 1 consists of jets 5 first spraying solvent on said chain 1 and then jets 5 applying high air pressure to said continuous chain 1. Depending on the cleaning requirements of said chain 1, said chain 1 is moved through the invention at least twice while the jets 5 apply solvent. One of the zones of jets 5 on each side contains a pneumatic brush 13 capable of removing built-up carbon that has been baked onto said chain 1. If warranted by the condition of the build-up of lubricants and debris baked onto said chain 1, the number of cycles required to complete the cleaning process of said chain 1 may be repeated as necessary; sometimes removal by hand is required. Next, there are usually four cycles to remove debris where the air pressure in the range of 120 to 150 pounds per square inch is applied by the jets 5 to said chain 1. Then the vertical wheels 14 of said chain 1 are brush with air for two cycles. Next, said chain 1 is air dried with air pressure in the range of 120 to 150 pounds per square inch. The jets 5 perform a lubricating function in the final phase. The final step of lubricating said chain 1 after said chain 1 is cleaned is important in order to assure proper operation of the bread-bun oven or proof boxes.

A control panel equipped with gauges for the separate tanks containing solvent and lubricant under pressure from compressed air controls the flow and the pressure under which the solvent, air and lubricant flow to the invention.

Figure 3:
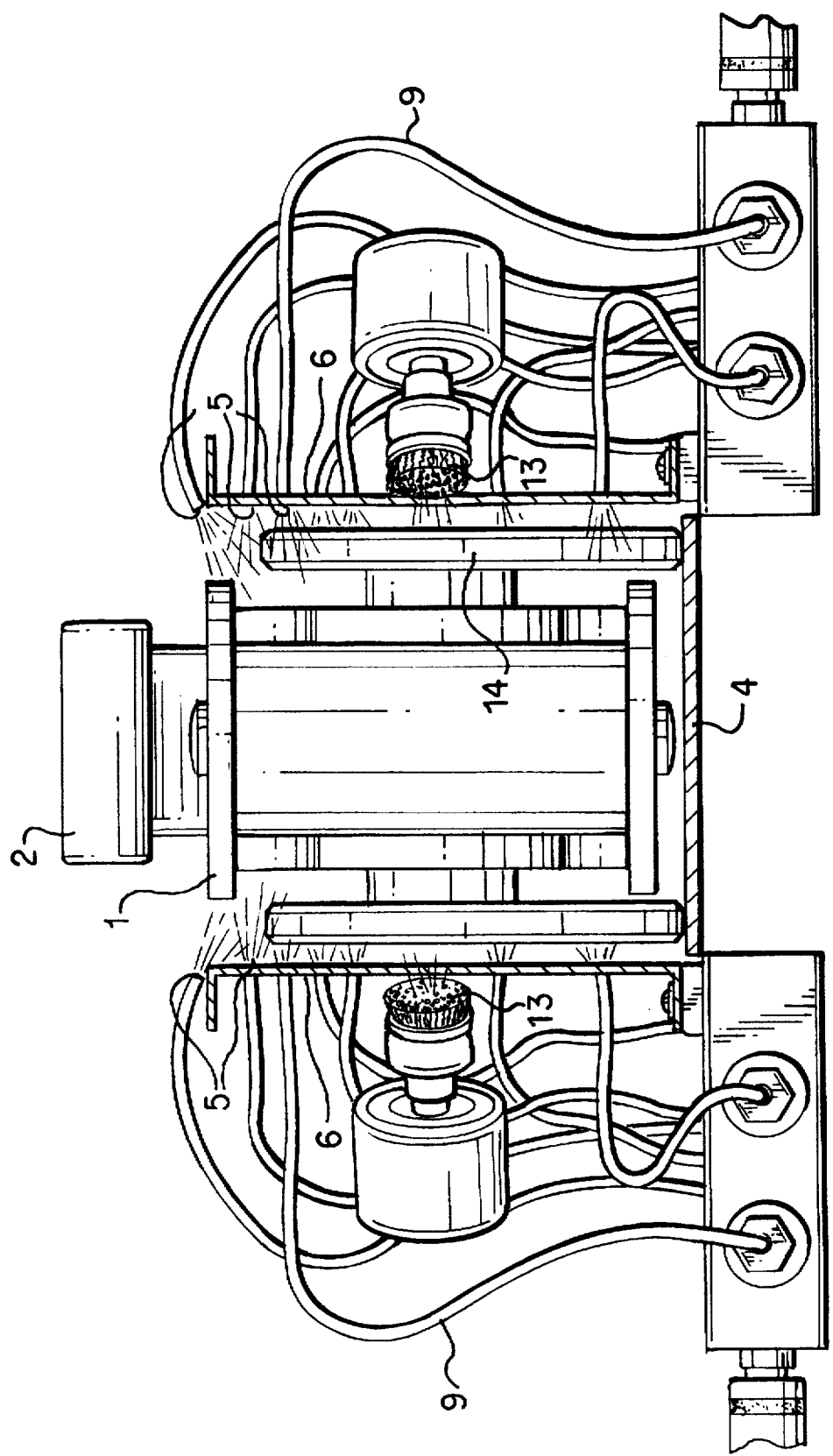
FIG. 3 is a partial cross-sectional view of the chain cleaner constructed in accordance with the invention.

FIG. 3 is a partial cross-sectional view showing a vertical wheel 14 of the chain 1 as it passes over the platform by the brushes 13 and jets 5 of the invention. As the wheel passes 14, the brushes 13 come into contact with the wheel 14 which causes debris to be removed from the wheel 14 the brushes 13 rotate and rub the vertical wheels 14.

I claim:

1. In a bread-bun oven or proof box which includes a movable continuous chain, said chain having vertical wheels riding on a continuous track, the improvement comprising: a chain cleaning device adaptable for cleaning the continuous chain of a bread-bun oven or proof box including the vertical wheels of said continuous chain wherein said chain cleaning device comprises multiple nozzles adaptable for directing solvents and air at said continuous chain and wherein stationary tubes are attached to a vertical plate with holes for placement of said stationary tubes and wherein brushes are activated by a U-shaped lever as the vertical wheels of said continuous chain ride over the U-shaped lever as said continuous chain is moved through said cleaning device thereby cleaning said continuous chain through use of jet streams produced by air pressure and brushes, without requiring dismantling of said chain piece by piece from the track of said chain.

2. The chain cleaning device as claimed by claim 1 wherein said nozzles direct a jet stream to clean the wheels of said chain from inside of said chain to outside of said chain.

3. The chain cleaning device as claimed by claim 1 wherein said nozzles are adaptable to a platform that causes said chain to move from the track onto said platform and then lowers said chain back into said track.

4. The chain cleaning device as claimed by claim 1 wherein said jet streams are adjustable as to pressure and direction and able to accept lubricants.

5. The chain cleaning device as claimed by claim 1 wherein said jet streams are adjustable as to pressure and direction and able to accept air flow.

6. The chain cleaning device as claimed by claim 1 wherein there are plates attached to said device.

7. The chain cleaning device as claimed by claim 1 wherein said device is adaptable to being permanently built into the track and operated as needed.

* * * * *